United States Patent
Lin et al.

(10) Patent No.: US 11,536,866 B2
(45) Date of Patent: Dec. 27, 2022

(54) DIFFRACTED WAVE IMAGING METHOD, DEVICE AND ELECTRONIC APPARATUS

(71) Applicant: CHINA UNIVERSITY OF MINING & TECHNOLOGY, BEIJING, Beijing (CN)

(72) Inventors: Peng Lin, Beijing (CN); Jingtao Zhao, Beijing (CN); Suping Peng, Beijing (CN); Xiaoqin Cui, Beijing (CN)

(73) Assignee: CHINA UNIVERSITY OF MINING & TECHNOLOGY, BEIJING, Beijing (CN)

(*) Notice: Subject to any disclaimer, the term of this patent is extended or adjusted under 35 U.S.C. 154(b) by 0 days.

(21) Appl. No.: 17/506,596

(22) Filed: Oct. 20, 2021

(65) Prior Publication Data
US 2022/0196864 A1    Jun. 23, 2022

(30) Foreign Application Priority Data
Aug. 20, 2020   (CN) .......................... 202010846038.6

(51) Int. Cl.
 *G01V 1/34*    (2006.01)
 *G01V 1/30*    (2006.01)
(52) U.S. Cl.
 CPC ............ *G01V 1/345* (2013.01); *G01V 1/303* (2013.01); *G01V 2210/60* (2013.01)
(58) Field of Classification Search
 CPC ..... G01V 1/345; G01V 1/303; G01V 2210/60
 See application file for complete search history.

(56) References Cited

U.S. PATENT DOCUMENTS

| | | | | |
|---|---|---|---|---|
| 10,302,788 B2 * | 5/2019 | Zhao | ............... | G01V 1/362 |
| 11,402,529 B2 * | 8/2022 | Liu | ............... | G01V 1/302 |
| 11,467,303 B2 * | 10/2022 | Zhang | ............... | G01V 1/302 |
| 2017/0023686 A1 | 1/2017 | Hegge et al. | | |

FOREIGN PATENT DOCUMENTS

| | | |
|---|---|---|
| CN | 105223607 A | 1/2016 |
| CN | 106772593 A | 5/2017 |
| CN | 107942374 A | 4/2018 |
| CN | 109507732 A | 3/2019 |
| CN | 110031900 A | 7/2019 |
| CN | 111337981 A | 6/2020 |
| CN | 111505719 A | 8/2020 |
| WO | 2016/032353 A1 | 3/2016 |

OTHER PUBLICATIONS

First search of priority application No. CN 202010846038.6.
Notification to Grant Patent Right for Invention of priority document CN 202010846038.6 dated Feb. 20, 2021.

* cited by examiner

*Primary Examiner* — Elias Desta
(74) *Attorney, Agent, or Firm* — IP & T Group LLP (57) ABSTRACT

The present disclosure provides a diffracted wave imaging method, device and electronic apparatus. The method comprises: acquiring pre-stack seismic wave field data of a to-be-processed area; extracting target data of a target imaging point; fitting target time sample points in the target data based on the Gaussian model and solving the fitting function to determine a distribution range of the stationary point position signal of the reflected wave in the target data; determining migration imaging data of the target imaging point based on the target data and the distribution range; and determining a diffracted wave imaging result of the to-be-processed area based on the migration imaging data of all the imaging points in the to-be-processed area.

13 Claims, 2 Drawing Sheets

DIFFRACTED WAVE IMAGING METHOD, DEVICE AND ELECTRONIC APPARATUS

CROSS-REFERENCE TO RELATED APPLICATIONS

The present disclosure claims priority to Chinese Patent Application No. 202010846038.6, filed with the Chinese Patent Office on Aug. 20, 2020, entitled "Diffracted Wave Imaging Method, Device and Electronic Apparatus", the contents of which are incorporated herein by reference in its entirety.

TECHNICAL FIELD

The present disclosure relates to the technical field of seismic explorations, in particular to a diffracted wave imaging method, device and electronic apparatus.

BACKGROUND ART

Small-scale, non-continuous geological bodies, such as faults, collapse columns and cracks, are often closely related to distributions of mineral resources. Precisely positioning the inhomogeneous and discontinuous geological bodies may effectively improve the success rate of exploration, reduce costs, and avoid possible occurrences of geological disasters and avoid risks. A diffracted wave is a seismic response to small-scale geological bodies and contains construction information of the small-scale geological bodies, and may be used to precisely position the inhomogeneous and discontinuous geological bodies and provide stronger underground space illuminance. However, compared to the reflected waves, the diffracted waves are characterized by more rapid amplitude attenuation and have much weaker energy during the propagation process, and are easily masked by the reflected waves with strong energy. Therefore, it is necessary to separate the diffracted wave from the reflected wave to enhance the diffracted response, so as to perform a high-precision imaging of the diffracted wave and a precise positioning of the small-scale geological bodies.

In the existing diffracted wave imaging methods, the diffracted wave is mostly separated in the common-offset domain or the post-stack domain, using only the difference in kinematic characteristics of the reflected wave and the diffracted wave, which does not facilitate the diffracted wave imaging. In addition, it is difficult to effectively estimate the Fresnel zone by the Fresnel zone estimation based diffracted wave common-imaging-point gather imaging method, having a larger error.

In summary, the diffracted wave imaging method in the prior art has the technical problem of a poor precision in imaging a diffracted wave.

SUMMARY

An object of the present disclosure is to provide a diffracted wave imaging method, device and electronic apparatus, to alleviate the technical problem in the prior art that the diffracted wave imaging method has a poor precision in imaging a diffracted wave.

In a first aspect, an embodiment of the present disclosure provides a diffracted wave imaging method, comprising: acquiring pre-stack seismic wave field data of a to-be-processed area; extracting target data of a target imaging point based on the pre-stack seismic wave field data, wherein the target imaging point is any imaging point of all the imaging points in the to-be-processed area, and the target data comprises: a stationary point position signal of a reflected wave and a signal of a diffracted wave event; fitting target time sample points in the target data based on the Gaussian model and solving the fitting function to determine a distribution range of the stationary point position signal of the reflected wave in the target data, wherein the target time sample points are sampling points having the same time parameter; determining a migration imaging data of the target imaging point based on the target data and the distribution range; and determining a diffracted wave imaging result of the to-be-processed area based on the migration imaging data of all the imaging points in the to-be-processed area.

In an optional embodiment, the extracting a target data of a target imaging point based on the pre-stack seismic wave field data comprises: performing a migration velocity analysis on the pre-stack seismic wave field data to determine a seismic wave migration velocity file; performing migration processing on the pre-stack seismic wave field data based on the seismic wave migration velocity file to obtain a common-imaging-point gather data of all imaging points in the to-be-processed area; and performing signal component decomposition on the common-imaging-point gather data of the target imaging point according to stationary point Fresnel zone distribution characteristics of the reflected wave and morphological characteristics of the diffracted wave to obtain the target data.

In an optional embodiment, the performing signal component decomposition on the common-imaging-point gather data of the target imaging point according to stationary point Fresnel zone distribution characteristics of the reflected wave and morphological characteristics of the diffracted wave to obtain the target data comprises: constructing an optimization function of the signal component decomposition according to Fresnel zone distribution characteristics of the stationary point of the reflected wave and morphological characteristics of the diffracted wave, wherein the optimization function is expressed as:

$$\min_{\{d_k\},\{\omega_k\}} \left\{ \sum_{k=1}^{N} \|\partial_x [d_k(x)e^{-j\omega_k x}]\|_2^2 \right\}, \text{ s.t. } \sum_{k=1}^{N} d_k(x) = d(x),$$

where $d_k(x)$ represents the kth decomposed linear signal pattern, $\omega_k$ represents a center frequency of $d_k(x)$, x represents an inclined angle, N represents a total number of decomposed linear signal patterns, $\partial_x$ represents x-direction partial derivative operator, and $d(x)$ represents common-imaging-point gather data of the target imaging point; transforming the optimization function into a Lagrangian unconstrained optimization function, wherein the Lagrangian unconstrained optimized function is expressed as $$L(\{d_k\}, \{\omega_k\}, \lambda) := \alpha \sum_{k1}^{N} \|\partial_x [d_k(x)]e^{-j\omega_k x}\|_2^2 + \left\| d(x) - \sum_{k=1}^{N} d_k(x) \right\|_2^2 + \left\langle \lambda(x), d(x) - \sum_{k=1}^{N} d_k(x) \right\rangle,$$

where $\alpha$ represents a weighting factor, and $\lambda$ represents a Lagrangian multiplier; and solving the Lagrangian unconstrained optimization function to obtain the target data.

In an optional embodiment, the fitting target time sample points in the target data based on the Gaussian model and solving the fitting function to determine a distribution range of the stationary point position signal of the reflected wave in the target data comprises: fitting target time sample points in the target data by using a fitting function $$J = \sum_{i=1}^{K} \left| \frac{c}{\sqrt{2\pi}\,\sigma} e^{-\frac{(a_i-\mu)^2}{2\sigma^2}} - b_i \right|,$$

where J represents a difference in fitting, K represents the number of the target time sample points, c represents an amplitude fitting multiple, $a_i$ represents a coordinate value in a horizontal direction of the ith target time sample point, $b_i$ represents an amplitude value corresponding to the $a_i$ position, μ represents a mean value of the Gaussian models corresponding to the target time sample points, and σ represents a variance of the Gaussian models corresponding to the target time sample points; transforming the fitting function with a logarithmic method to obtain an optimized fitting function; solving the optimized fitting function to obtain a mean value and a variance of the Gaussian models corresponding to the target time sample points; and determining a distribution range of the stationary point position signal of the reflected wave in the target data based on the mean value and the variance of the Gaussian models corresponding to all time sample points.

In an optional embodiment, the determining a migration imaging data of the target imaging point based on the target data and the distribution range comprises: setting an amplitude value of the stationary point position signal of the reflected wave within the distribution range to be zero, to obtain a processed target data; and stacking the processed target data in a horizontal direction to obtain the migration imaging data of the target imaging point.

In a second aspect, an embodiment of the present disclosure provides a diffracted wave imaging device, comprising: an acquisition module configured to acquire a pre-stack seismic wave field data of a to-be-processed area; an extraction module configured to extract target data of a target imaging point based on the pre-stack seismic wave field data, wherein the target imaging point is any imaging point of all the imaging points in the to-be-processed area, and the target data comprises: a stationary point position signal of a reflected wave and a signal of a diffracted wave event; a fitting module configured to fit target time sample points in the target data based on the Gaussian model and solve the fitting function to determine a distribution range of the stationary point position signal of the reflected wave in the target data, wherein the target time sample points are sampling points having the same time parameter; a first determination module configured to determine a migration imaging data of the target imaging point based on the target data and the distribution range; and a second determination module configured to determine a diffracted wave imaging result of the to-be-processed area based on the migration imaging data of all the imaging points in the to-be-processed area.

In an optional embodiment, the extraction module comprises: an analyzing unit configured to perform a migration velocity analysis on the pre-stack seismic wave field data to determine a seismic wave migration velocity file; a migration processing unit configured to perform migration processing on the pre-stack seismic wave field data based on the seismic wave migration velocity file to obtain common-imaging-point gather data of all imaging points in the to-be-processed area; and a decomposing unit configured to perform signal component decomposition on the common-imaging-point gather data of the target imaging point according to stationary point Fresnel zone distribution characteristics of the reflected wave and morphological characteristics of the diffracted wave to obtain the target data.

In an optional embodiment, the decomposing unit is specifically configured to: construct an optimization function of the signal component decomposition according to Fresnel zone distribution characteristics of the stationary point of the reflected wave and morphological characteristics of the diffracted wave, wherein the optimization function is expressed as:

$$\min_{\{d_k\},\{\omega_k\}} \left\{ \sum_{k=1}^{N} \left\| \partial_x \left[ d_k(x) e^{-j\omega_k x} \right] \right\|_2^2 \right\}, \text{ s.t. } \sum_{k=1}^{N} d_k(x) = d(x),$$

where $d_k(x)$ represents the kth decomposed linear signal pattern, $\omega_k$ represents a center frequency of $d_k(x)$, x represents an inclined angle, N represents a total number of decomposed linear signal patterns, $\partial_x$ represents x-direction partial derivative operator, and d(x) represents common-imaging-point gather data of the target imaging point; transform the optimization function into a Lagrangian unconstrained optimization function, wherein the Lagrangian unconstrained optimized function is expressed as $$L(\{d_k\}, \{\omega_k\}, \lambda) := \alpha \sum_{k1}^{N} \left\| \partial_x [d_k(x)] e^{-j\omega_k x} \right\|_2^2 + \left\| d(x) - \sum_{k=1}^{N} d_k(x) \right\|_2^2 + \left\langle \lambda(x), d(x) - \sum_{k=1}^{N} d_k(x) \right\rangle,$$

where α represents a weighting factor, and λ represents a Lagrangian multiplier; and solve the Lagrangian unconstrained optimization function to obtain the target data.

In a third aspect, an embodiment of the present disclosure provides an electronic apparatus comprising a memory and a processor, where the memory stores computer programs that can run on the processor, and the processor implements steps of the method described in any one of the preceding embodiments when executing the computer programs.

In a fourth aspect, an embodiment of the present disclosure provides a computer-readable medium having non-volatile program codes executable by a processor, and the program codes cause the processor to execute the method described in any one of the preceding embodiments.

The diffracted wave imaging method provided by the present disclosure comprises: acquiring a pre-stack seismic wave field data of a to-be-processed area; extracting target data of a target imaging point based on the pre-stack seismic wave field data, wherein the target imaging point is any imaging point of all the imaging points in the to-be-processed area, and the target data comprises: a stationary point position signal of a reflected wave and a signal of a diffracted wave event; fitting target time sample points in the target data based on the Gaussian model and solving the fitting function to determine a distribution range of the stationary point position signal of the reflected wave in the target data, wherein the target time sample points are sampling points having the same time parameter; determining migration imaging data of the target imaging point based on the target data and the distribution range; and determining a diffracted wave imaging result of the to-be-processed area based on the migration imaging data of all the imaging points in the to-be-processed area. With this method, by using different manifestations of the reflected wave and the diffracted wave in the target data, and through Gaussian model fitting, the Fresnel zone distribution of the reflected wave is accurately positioned and then the stationary point position signal of the reflected wave is accurately separated from the target data, so that the diffracted wave is separated, realizing a high-precision imaging of the diffracted wave, which effectively alleviates the technical problem in the prior art that the diffracted wave imaging method has a poor precision in imaging a diffracted wave.

BRIEF DESCRIPTION OF DRAWINGS

Drawings required for use in the description of embodiments or the prior art will be introduced briefly below in order to explain the technical solutions of the embodiments of the present disclosure or of the prior art more clearly, it will be apparent that the drawings described below are merely illustrative of some embodiments of the present disclosure, and those skilled in the art can also obtain, from these drawings, other drawings without inventive efforts.

DETAILED DESCRIPTION OF THE EMBODIMENTS

In order to make the objects, technical solutions and advantages of the embodiments of the present disclosure clearer, the technical solutions of the embodiments in the present disclosure will be clearly and completely described in the following with reference to the accompanying drawings in the present disclosure, and it is apparent that the described embodiments are some but not all of the embodiments of the present disclosure. The assemblies of the present disclosure, which are generally described and illustrated in the figures herein, may be arranged and designed in a variety of different configurations.

Therefore, the detailed description of the present disclosure set forth in the accompanying drawings is not intended to limit the claimed scope of the present disclosure, but illustrate only selected embodiments of the present disclosure. All the other embodiments, obtained by those skilled in the art in light of the embodiments of the disclosure without inventive efforts, will fall within the claimed scope of the present disclosure.

Some embodiments of the present disclosure will be described in detail below in connection with the drawings. Embodiments below and the features in the embodiments may be combined with one another without conflicting.

A diffracted wave is a seismic response to small-scale geological bodies (such as faults, collapse columns, cracks, etc.) and contains construction information of small-scale geological bodies, and may be used to precisely position inhomogeneous and discontinuous geological bodies and provide stronger underground space illuminance, so as to improve the success rate of exploration, and avoid possible occurrences of geological disasters and avoid risks. Therefore, by performing a high-precision imaging of the diffracted waves, positioning of the small-scale geological bodies may be implemented precisely. With most of the existing diffracted wave imaging methods, the diffracted wave is separated in the common-offset domain or the post-stack domain, using only the difference in kinematic characteristics of the reflected wave and the diffracted wave, which does not facilitate the diffracted wave imaging, and it is difficult to effectively estimate the Fresnel zone by the Fresnel zone estimation based diffracted wave common-imaging-point gather imaging method, having a larger error. Moreover, regarding an angle-domain gather, there is a certain deviation between an inclined angle of the stationary point position and an inclined angle of the real underground structure, which does not facilitate suppressing the reflected wave. In view of the above, embodiments of the present disclosure provide a diffracted wave imaging method to alleviate the technical problems proposed in the above text.

Embodiment 1

Figure 1:
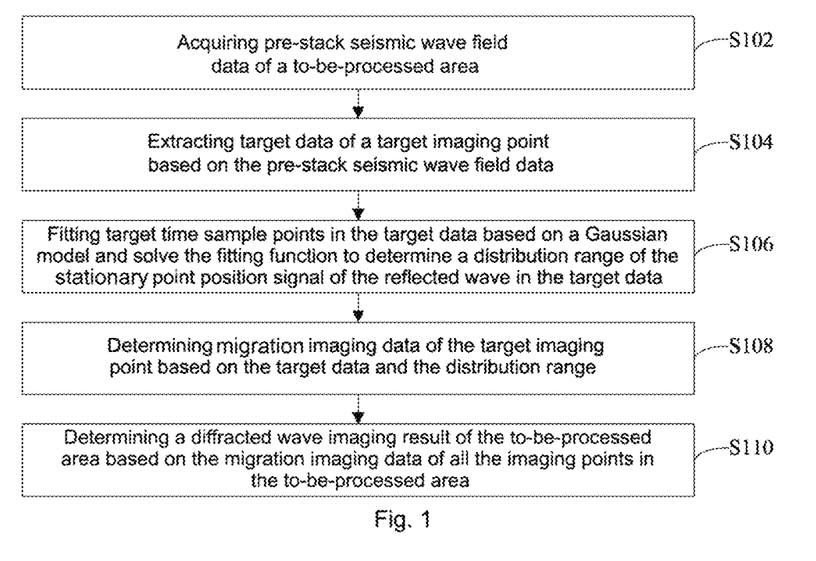
FIG. 1 is a flowchart of a diffracted wave imaging method provided by an embodiment of the present disclosure.

FIG. 1 is a flowchart of a diffracted wave imaging method provided by an embodiment of the present disclosure. As shown in FIG. 1, the method specifically comprises the following steps:

Step S102. Acquire pre-stack seismic wave field data of a to-be-processed area.

Step S104. Extract target data of a target imaging point based on the pre-stack seismic wave field data.

In the case of conducting geological exploration in the to-be-processed area in the field, a seismic source may occur by dropping explosive packs or using a seismic source instrument, so that the pre-stack seismic wave field data of the to-be-processed area is obtained, where the above pre-stack seismic wave field data may be obtained by a seismic exploration instrument.

After the pre-stack seismic wave field data is obtained, the target data of the target imaging point is firstly extracted, wherein the target imaging point is any imaging point of all the imaging points in the to-be-processed area, and the target data comprises: a stationary point position signal of a reflected wave and a signal of a diffracted wave event, that is, for each imaging point in the to-be-processed area, its target data needs to be extracted for processing in subsequent steps, for the purpose of accurately separating the stationary point position signal of the reflected wave from the signal of the diffracted wave event in the target data.

Step S106. Fit target time sample points in the target data based on the Gaussian model and solve the fitting function to determine a distribution range of the stationary point position signal of the reflected wave in the target data.

Figure 2:
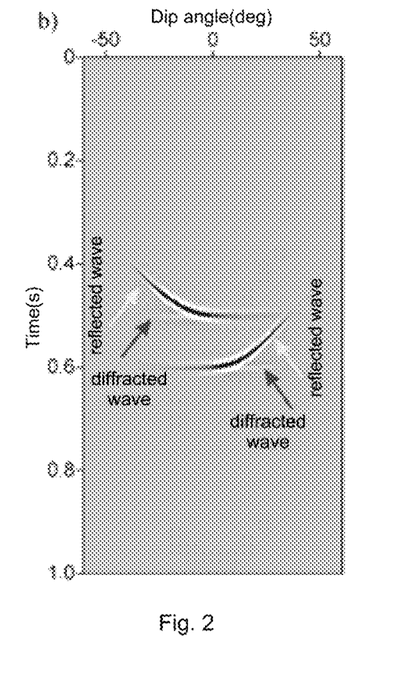
FIG. 2 is a schematic view of a common-imaging-point gather of target imaging point provided by an embodiment of the present disclosure.

After the target data of the target imaging point is obtained, since the distribution range of the stationary point position signal of the reflected wave in the target data complies with Gaussian distribution, Gaussian model is used to fit target time sample points in the target data, wherein the target time sample points are sampling points having the same time parameter. FIG. 2 provides a schematic view of a common-imaging-point gather of a target imaging point.

As can be seen from FIG. 2, the traversal axis of the schematic view of the common-imaging-point gather indicates an angle, and the vertical axis indicates time. Therefore, the sampling points having the same time parameter are in the same layer in the coordinate system, equivalent to being in the same time profile. That is, in order to determine the distribution range of the stationary point position signal of the reflected wave in the target data, the time sample points of each layer need to be fitted by the Gaussian model, and then the fitting function is solved separately. That is, the distribution range of the stationary point position signal of the reflected wave in the target data may be determined by model parameters of the Gaussian model.

Step S108. Determine migration imaging data of the target imaging point based on the target data and the distribution range.

Step S110. Determine a diffracted wave imaging result of the to-be-processed area based on the migration imaging data of all the imaging points in the to-be-processed area.

As can be seen from the forgoing description, the target data comprises the stationary point position signal of the reflected wave and the signal of the diffracted wave event and thus after a distribution range of the stationary point position signal of the reflected wave in the target data is determined, it can be accurately separated from the target data to obtain a distribution of the signal of the diffracted wave event, thereby determining a migration imaging data of the target imaging point.

By processing all imaging points in the to-be-processed area with processing procedures in Steps S106-S108, the migration imaging data of all imaging points in the to-be-processed area may be obtained. Finally, a set of the migration imaging data of all imaging points is taken as the diffracted wave imaging result of the to-be-processed area.

The diffracted wave imaging method provided by the present disclosure comprises: acquiring pre-stack seismic wave field data of a to-be-processed area; extracting target data of a target imaging point based on the pre-stack seismic wave field data, wherein the target imaging point is any imaging point of all the imaging points in the to-be-processed area, and the target data comprises: a reflected wave stationary point position signal and a diffracted wave event signal; fitting target time sample points in the target data based on the Gaussian model and solving the fitting function to determine a distribution range of the reflected wave stationary point position signal in the target data, wherein the target time sample points are sampling points having the same time parameter; determining migration imaging data of the target imaging point based on the target data and the distribution range; and determining a diffracted wave imaging result of the to-be-processed area based on the migration imaging data of all the imaging points in the to-be-processed area. With this method, by using different manifestations of the reflected wave and the diffracted wave in the target data and through Gaussian model fitting, the Fresnel zone distribution of the reflected wave is accurately positioned and then the reflected wave stationary point position signal is accurately separated from the target data, so that the diffracted wave is separated, realizing a high-precision imaging of the diffracted wave, which effectively alleviates the technical problem in the prior art that the diffracted wave imaging method has a poor precision in imaging a diffracted wave.

The diffracted wave imaging processes conducted by the diffracted wave imaging method provided by the embodiment of the present disclosure are briefly introduced above, and the specific processing steps involved therein are described in detail below.

In an optional embodiment, the above Step S104 of extracting target data of a target imaging point based on the pre-stack seismic wave field data specifically comprises the following steps.

Step S1041. Perform a migration velocity analysis on the pre-stack seismic wave field data to determine a seismic wave migration velocity file.

Specifically, the migration velocity file comprises a formation velocity parameter which is used to calculate seismic wave travel times when a seismic wave propagates in the underground space and obtained by performing the migration velocity analysis on the pre-stack seismic wave field data, wherein the above migration velocity analysis is a velocity modeling technology which determines a velocity parameter by analyzing a focus property of the seismic data, thereby obtaining the migration velocity file of the seismic wave, wherein the migration velocity of the reflected wave can be obtained by using the migration velocity file of the seismic wave.

Step S1042. Perform migration processing on the pre-stack seismic wave field data based on the seismic wave migration velocity file to obtain common-imaging-point gather data of all imaging points in the to-be-processed area.

The underground is divided by mesh, with an imaging point being every preset distance. If there are a plurality of diffracted waves passing through the imaging point, the imaging point is a common-imaging-point. Therefore, the common-imaging-point is spatial location information provided by mesh dividing. A reception record of a single geophone is called a seismic trace, and a set of a plurality of seismic traces is called a gather. After the seismic wave migration velocity file is obtained, common-imaging-point gather data of all imaging points in the to-be-processed area may be obtained by performing migration processing on the pre-stack seismic wave field data.

Step S1043. Perform signal component decomposition on the common-imaging-point gather data of the target imaging point according to stationary point Fresnel zone distribution characteristics of the reflected wave and morphological characteristics of the diffracted wave to obtain the target data.

After the common-imaging-point gather data of all imaging points in the to-be-processed area is obtained, signal component decomposition may be applied, for the common-imaging-point gather data of any imaging point in the to-be-processed area, to extract the target data comprising a stationary point position signal of a reflected wave and a signal of a diffracted wave event, according to the stationary point Fresnel zone distribution characteristics of the reflected wave and morphological characteristics of the diffracted wave.

Figure 3:
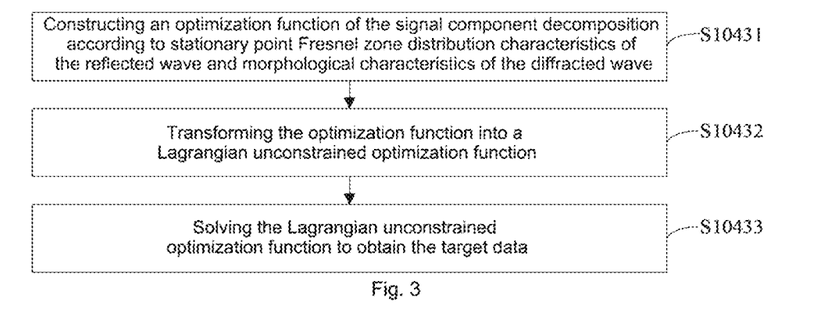
FIG. 3 is a flowchart of performing signal component decomposition on common-imaging-point gather data of the target imaging point according to stationary point Fresnel zone distribution characteristics of the reflected wave and morphological characteristics of the diffracted wave to obtain the target data provided by an embodiment of the present disclosure.

Specifically, as shown in FIG. 3, the above Step S1043 of performing signal component decomposition on the common-imaging-point gather data of the target imaging point according to stationary point Fresnel zone distribution characteristics of the reflected wave and morphological characteristics of the diffracted wave to obtain the target data specifically comprises the following steps.

Step S10431. Construct an optimization function of the signal component decomposition according to the stationary point Fresnel zone distribution characteristics of the reflected wave and morphological characteristics of the diffracted wave.

In an embodiment of the present disclosure, a linear signal is extracted by the signal component decomposition according to the stationary point Fresnel zone distribution characteristics of the reflected wave and morphological characteristics of the diffracted wave, wherein the optimization function is expressed as:

$$\min_{\{d_k\},\{\omega_k\}} \left\{ \sum_{k=1}^{N} \|\partial_x [d_k(x)e^{-j\omega_k x}]\|_2^2 \right\}, \text{ s.t. } \sum_{k=1}^{N} d_k(x) = d(x),$$

where $d_k(x)$ represents the kth decomposed linear signal pattern, $\omega_k$ represents a center frequency of $d_k(x)$, x represents an inclined angle, N represents a total number of decomposed linear signal patterns, $\partial_x$ represents x-directional partial derivative operator, and $d(x)$ represents the common-imaging-point gather data of the target imaging point.

Step S10432. Transform the optimization function into a Lagrangian unconstrained optimization function.

In order to extract a linear signal, the above optimization problem may be transformed into a Lagrangian unconstrained optimization problem, that is, after the above optimization function is constructed, the optimization function may be transformed into a Lagrangian unconstrained optimization function, wherein the Lagrangian unconstrained optimization function is expressed as $$L(\{d_k\}, \{\omega_k\}, \lambda) := $$
$$\alpha \sum_{k=1}^{N} \|\partial_x [d_k(x)]e^{-j\omega_k x}\|_2^2 + \left\| d(x) - \sum_{k=1}^{N} d_k(x) \right\|_2^2 + \left\langle \lambda(x), d(x) - \sum_{k=1}^{N} d_k(x) \right\rangle,$$

where $\alpha$ represents a weighting factor, and $\lambda$ represents a Lagrangian multiplier.

Step S10433. Solve the Lagrangian unconstrained optimization function to obtain the target data.

In the embodiment of the present disclosure, the target data belongs to one of the linear signal patterns. Therefore, by solving the above unconstrained optimization function, the N th decomposed linear signal pattern $d_k(x)$ may be obtained, and then the target data is obtained.

The processes of how to obtain the target data of the target imaging point are described in detail above, and the processes of how to determine the distribution range of the stationary point position signal of the reflected wave in the target data are specifically introduced below.

In an optional embodiment, the Step S106 of fitting target time sample points in the target data based on the Gaussian model and solving the fitting function to determine a distribution range of a stationary point position signal of the reflected wave in the target data specifically comprises the following steps.

Step S1061. Fit target time sample points in the target data by using a fitting function $$J = \sum_{i=1}^{K} \left| \frac{c}{\sqrt{2\pi}\sigma} e^{-\frac{(a_i-\mu)^2}{2\sigma^2}} - b_i \right|.$$

Specifically, the amplitude distribution of each layer of time sample points in the common-imaging-point gather data complies with the Gaussian distribution. In other words, each layer of time sample points is a one-dimensional array that complies with the one-dimensional Gaussian distribution characteristics, so that the target time sample points in the target data can be fitted using the Gaussian model, wherein the fitting function is expressed as:

$$J = \sum_{i=1}^{K} \left| \frac{c}{\sqrt{2\pi}\sigma} e^{-\frac{(a_i-\mu)^2}{2\sigma^2}} - b_i \right|,$$

where J represents a difference in fitting, K represents the number of the target time sample points, c represents an amplitude fitting multiple, $a_i$ represents a coordinate value in a horizontal direction of the ith target time sample point, $b_i$ represents an amplitude value corresponding to the $a_i$ position, $\mu$ represents a mean value of the Gaussian models corresponding to the target time sample points, and $\sigma$ represents a variance of the Gaussian models corresponding to the target time sample points.

Step S1062. Transform the fitting function with a logarithmic method to obtain an optimized fitting function.

After the fitting function is obtained, the optimized fitting function can be obtained by transforming the fitting function with the logarithmic method, wherein the optimized fitting function may be represented as:

$$J = \sum_{i=1}^{K} \left| \ln \frac{c}{\sqrt{2\pi}\sigma} - \frac{(a_i-\mu)^2}{2\sigma^2} - \ln b_i \right|.$$

Step S1063. Solve the optimized fitting function to obtain a mean value and a variance of the Gaussian models corresponding to the target time sample points.

Specifically, as can be seen from the expression of the optimized fitting function, the optimized fitting function is about one-variable quadratic least squares fitting problem of ($a_i$, $\ln b_i$), so an optimal solution to the Gaussian model may be obtained by the one-variable quadratic least squares fitting, that is, the mean value and the variance of the Gaussian models corresponding to the target time sample points can be obtained.

Step S1064. Determine a distribution range of the stationary point position signal of the reflected wave in the target data based on the mean value and the variance of the Gaussian models corresponding to all time sample points.

As can be seen from the above description, after the fitting process is performed on each layer of time sample points by Steps S1061-S1063, the Gaussian model corresponding to each layer of time sample points can be obtained, and by processing all the time sample points of the target data, a plurality of Gaussian models with determined mean value and variance corresponding to the target data can be obtained. Since the distribution of the reflected wave in the target data complies with the Gaussian distribution, according to the characteristics of the Gaussian distribution, the probability of the data in the range of [$\mu-3\sigma$, $\mu+3\sigma$] is 99.7%. Therefore, such interval may be considered to be the distribution range of the reflected wave, that is, the distribution range of the stationary point position signal of the reflected wave in the target data can be determined according to the mean and the variance of all Gaussian models.

In an optional embodiment, the above Step S108 of determining migration imaging data of the target imaging point based on the target data and the distribution range specifically comprise the following steps.

Step S1081. Set an amplitude value of the stationary point position signal of the reflected wave within the distribution range to be zero, to obtain processed target data.

Step S1082. Stack the processed target data in a horizontal direction to obtain the migration imaging data of the target imaging point.

After the distribution range of the stationary point position signal of the reflected wave in the target data is determined, suppressing of the reflected wave may be implemented, in order to separate the reflected wave from the target data, by setting the amplitude value in this interval to be 0, thus obtaining processed target data, that is, the processed target data may be understood as data containing only diffracted waves. Next, the processed target data is stacked in a horizontal direction, that is, by stacking the data along the same time layer, the migration imaging data of the target imaging point can be obtained.

By processing the common-imaging-point gather data of each imaging point according to the above procedures, the migration imaging data of all imaging points in the to-be-processed area can be obtained. Finally, a set of the migration imaging data of all imaging points is taken as a diffracted wave imaging result of the to-be-processed area.

In summary, in the diffracted wave imaging method provided by the embodiment of the present disclosure, the target data (the stationary point position signal of the reflected wave and the signal of the diffracted wave event) are separated by using different manifestations of the reflected wave and the diffracted wave in the common-imaging-point gather and through geometric mode decomposition, and then the Fresnel zone distribution of the reflected wave is accurately determined by Gaussian model fitting to obtain separation spatial information of the reflected wave, so that the diffracted wave is separated from the target data, realizing a high-precision imaging of the diffracted wave, and achieving the purpose of accurately positioning underground non-continuous geological bodies, where the technical problem in the prior art that the diffracted wave imaging method has poor precision in imaging a diffracted wave is effectively alleviated.

Embodiment 2

The embodiment of the present disclosure also provides a diffracted wave imaging device. The diffracted wave imaging device is mainly configured to execute the diffracted wave imaging method provided in Embodiment 1. The diffracted wave imaging device provided by the embodiment of the present disclosure is introduced below specifically.

Figure 4:
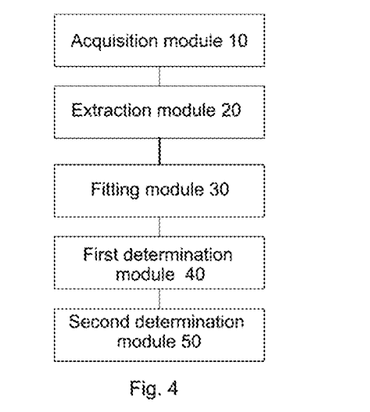
FIG. 4 is a function module diagram of a diffracted wave imaging device provided by an embodiment of the present disclosure.

FIG. 4 is a function module diagram of a diffracted wave imaging device provided by an embodiment of the present disclosure. As shown in FIG. 4, the device mainly comprises: an acquisition module 10, an extraction module 20, a fitting module 30, a first determination module 40, and a second determination module 50, where:

the acquisition module 10 is configured to acquire pre-stack seismic wave field data of a to-be-processed area.

The extraction module 20 is configured to extract the target data of the target imaging point based on the pre-stack seismic wave field data, wherein the target imaging point is any imaging point of all the imaging points in the to-be-processed area, and the target data comprises: a stationary point position signal of a reflected wave and a signal of a diffracted wave event.

The fitting module 30 is configured to fit target time sample points in the target data based on the Gaussian model and solve the fitting function to determine a distribution range of the stationary point position signal of the reflected wave in the target data, where the target time sample points are sample points having the same time parameter.

The first determination module 40 is configured to determine migration imaging data of the target imaging point based on the target data and the distribution range.

The second determination module 50 is configured to determine a diffracted wave imaging result of the to-be-processed area based on the migration imaging data of all the imaging points in the to-be-processed area.

The diffracted wave imaging device provided by the present disclosure comprises: an acquisition module 10 configured to acquire pre-stack seismic wave field data of a to-be-processed area; an extraction module 20 configured to extract target data of a target imaging point based on the pre-stack seismic wave field data, wherein the target imaging point is any imaging point of all the imaging points in the to-be-processed area, and the target data comprises: a stationary point position signal of a reflected wave and a signal of a diffracted wave event; a fitting module 30 configured to fit target time sample points in the target data based on the Gaussian model and solve the fitting function to determine a distribution range of the stationary point position signal of the reflected wave in the target data, wherein the target time sample points are sampling points having the same time parameter; a first determination module 40 configured to determine migration imaging data of the target imaging point based on the target data and the distribution range; and a second determination module 50 configured to determine a diffracted wave imaging result of the to-be-processed area based on the migration imaging data of all the imaging points in the to-be-processed area. With this device, by using different manifestations of the reflected wave and the diffracted wave in the target data and through Gaussian model fitting, the Fresnel zone distribution of the reflected wave is accurately positioned and then the stationary point position signal of the reflected wave is accurately separated from the target data, so that the diffracted wave is separated, realizing a high-precision imaging of the diffracted wave, which effectively alleviates the technical problem in the prior art that the diffracted wave imaging method has a poor precision in imaging a diffracted wave.

Optionally, the extraction module 20 comprises:

an analyzing unit configured to perform a migration velocity analysis on the pre-stack seismic wave field data to determine a seismic wave migration velocity file;

a migration processing unit configured to perform migration processing on the pre-stack seismic wave field data based on the seismic wave migration velocity file to obtain common-imaging-point gather data of all imaging points in the to-be-processed area; and a decomposing unit configured to perform a signal component decomposition on the common-imaging-point gather data of the target imaging point according to stationary point Fresnel zone distribution characteristics of the reflected wave and morphological characteristics of the diffracted wave to obtain the target data.

Optionally, the decomposing unit is specifically configured to:

construct an optimization function of the signal component decomposition according to stationary point Fresnel zone distribution characteristics of the reflected wave and morphological characteristics of the diffracted wave, wherein the optimization function is expressed as:

$$\min_{\{d_k\},\{\omega_k\}} \left\{ \sum_{k=1}^{N} \|\partial_x [d_k(x)e^{-j\omega_k x}]\|_2^2 \right\}, \quad \text{s.t.} \quad \sum_{k=1}^{N} d_k(x) = d(x),$$

where $d_k(x)$ represents the kth decomposed linear signal pattern, $\omega_k$ represents a center frequency of $d_k(x)$, x represents an inclined angle, N represents a total number of decomposed linear signal patterns, $\partial_x$ represents x-direction partial derivative operator, and d(x) represents the common-imaging-point gather data of the target imaging point.

The optimization function is transformed into a Lagrangian unconstrained optimization function, wherein the Lagrangian unconstrained optimization function is expressed as $$L(\{d_k\}, \{\omega_k\}, \lambda) := \alpha \sum_{k=1}^{N} \|\partial_x [d_k(x)]e^{-j\omega_k x}\|_2^2 + \left\|d(x) - \sum_{k=1}^{N} d_k(x)\right\|_2^2 + \left\langle \lambda(x), d(x) - \sum_{k=1}^{N} d_k(x) \right\rangle,$$

where $\alpha$ represents a weighting factor, and $\lambda$ represents a Lagrangian multiplier.

The Lagrangian unconstrained optimization function is solved to obtain the target data.

Optionally, the fitting module 30 comprises:

a fitting unit configured to fit target time sample points in the target data by using a fitting function $$J = \sum_{i=1}^{K} \left| \frac{c}{\sqrt{2\pi} \sigma} e^{-\frac{(a_i-\mu)^2}{2\sigma^2}} - b_i \right|,$$

where J represents a difference in fitting, K represents a number of the target time sample points, c represents an amplitude fitting multiple, $a_i$ represents a coordinate value in a horizontal direction of the i target time sample point, $b_i$ represents an amplitude value corresponding to the $a_i$ position, $\mu$ represents a mean value of the Gaussian models corresponding to the target time sample points, and $\sigma$ represents a variance of the Gaussian models corresponding to the target time sample points.

A transforming unit is configured to transform the fitting function with a logarithmic method to obtain an optimized fitting function.

A solving unit is configured to solve the optimized fitting function to obtain a mean value and a variance of the Gaussian models corresponding to the target time sample points.

A determining unit is configured to determine a distribution range of the stationary point position signal of the reflected wave in the target data based on the mean value and the variance of the Gaussian models corresponding to all time sample points.

Optionally, the first determination module 40 comprises:

a setting unit configured to set an amplitude value of the stationary point position signal of the reflected wave within the distribution range to be zero, to obtain processed target data; and a stacking unit is configured to stack the processed target data in a horizontal direction to obtain the migration imaging data of the target imaging point.

Embodiment 3

Figure 5:
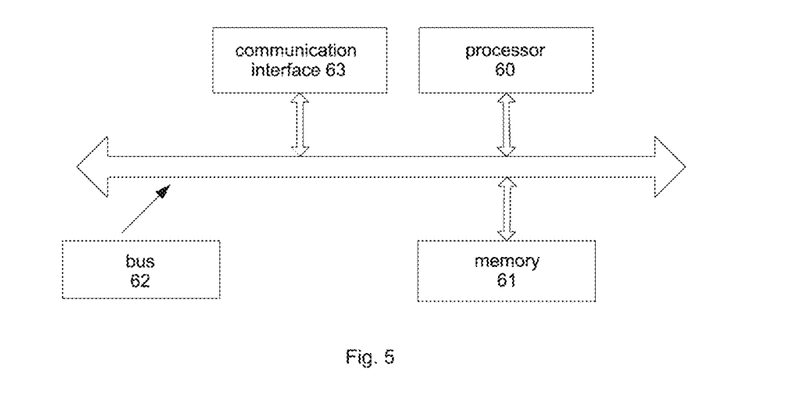
FIG. 5 is a schematic diagram of an electronic apparatus provided by the present disclosure.

Referring to FIG. 5, an embodiment of the present disclosure provides an electronic apparatus comprising a processor 60, a memory 61, a bus 62 and a communication interface 63, where the processor 60, the communication interface 63 and the memory 61 are connected through the bus 62; and the processor 60 is configured to execute executable module(s) stored in the memory 61, such as computer program(s).

In the above, the memory 61 may comprise a high-speed random access memory (RAM), and may also comprise a non-volatile memory, for example, at least one disk memory. A communication connection between the network element of the system and at least one other network element is implemented through at least one communication interface 63 (which may be wired or wireless), and the Internet, a wide area network, a local network, a metropolitan area network, etc. may be used.

The bus 62 may be an ISA bus, a PCI bus, an EISA bus, or the like. The bus may be classified into an address bus, a data bus, a control bus, and so on. For facilitating representation, only one bidirectional arrow is used for indication in FIG. 5, but it does not mean that there is only one bus or one type of bus.

In the above, the memory 61 is configured to store programs. The processor 60 executes the programs after receiving the execution instruction. The method executed by the device defined by the procedures disclosed in any of the foregoing embodiments of the present disclosure can be applied to the processor 60, or implemented by the processor 60.

The processor 60 may be an integrated circuit chip with signal processing capabilities. In the implementation process, respective steps of the above method can be completed by an integrated logic circuit of hardware or instructions in the form of software in the processor 60. The above processor 60 may be a general-purpose processor, including a central processing unit (abbreviated as CPU for short), a network processor (abbreviated as NP for short), etc.; or may be a digital signal processor (abbreviated as DSP for short), an application specific integrated circuit (abbreviated as ASIC for short), or an field programmable gate array (abbreviated as FPGA for short) or other programmable logic device, discrete gate or transistor logic device, a discrete hardware component. Various methods, steps, and logical block diagrams disclosed in the embodiments of the present disclosure may be implemented or executed. The general purpose processor may be a micro-processor or the processor may be any conventional processor or the like. Steps of the method disclosed in the embodiments of the present disclosure may be directly embodied as being executed and completed by a hardware decoding processor, or executed and completed by a combination of hardware and software modules in the decoding processor. The software module may be located in a mature storage medium in the art, such as a random access memory, a flash memory, a read-only memory, a programmable read-only memory, or an electrically erasable programmable memory and a register. The storage medium is located in the memory 61, and the processor 60 reads information in the memory 61, and completes the steps of the above method in combination with its hardware.

A computer program product of the diffracted wave imaging method, device and electronic apparatus provided by the embodiments of the present disclosure comprises a computer-readable storage medium storing non-volatile program codes executable by a processor, and instructions included by the program codes can be used to execute the method described in the previous method embodiment. For specific implementation, please refer to the method embodiment, which will not be repeated here.

In addition, respective functional units in the various embodiments of the present disclosure may be integrated into one processing unit, or it may be the case that each unit may exist alone physically, or it may be the case that two or more units may be integrated into one unit.

If the function is implemented in the form of a software functional unit and sold or used as an independent product, it can be stored in a non-volatile computer readable storage medium executable by a processor. Based on this understanding, the technical solution of the present disclosure essentially or the part that contributes to the prior art or the part of the technical solution can be embodied in the form of a software product, and the computer software product is stored in a storage medium, including several instruction to enable a computer apparatus (which may be a personal computer, a server, or a network device, etc.) to execute all or part of the steps of the methods described in the various embodiments of the present disclosure. The forgoing storage media comprise: a U disk, a mobile hard disk, a read-only memory (ROM), a random access memory (RAM), a magnetic disk or an optical disk etc. that can store program codes.

It should be noted that similar reference numerals and letters indicate similar items in the following figures, and therefore, once an item is defined in a drawing, it is not necessary to further define or explain it in the subsequent drawings.

In the description of the present disclosure, it should be indicated that orientation or positional relations indicated by terms such as "center", "up", "down", "left", "right", "vertical", "horizontal", "inside", and "outside" are based on the orientation or positional relations as shown in the figures, or the conventionally placed orientation or positional relationship when the product of the disclosure is used, only for facilitating description of the present disclosure and simplifying the description, rather than indicating or implying that the referred devices or elements must be in a particular orientation or constructed or operated in the particular orientation, and therefore they should not be construed as limiting the present disclosure. In addition, terms such as "first", "second", and "third" are used only for distinguishing the description, and should not be understood as indicating or implying to have importance in relativity.

In addition, the terms "horizontal", "vertical", "overhanging", etc. are not intended to mean that the member is required to be absolutely horizontal or overhanging, but may be slightly inclined. For example, the term "horizontal" merely means that its direction is more horizontal with respect to "vertical", and does not mean that the structure must be completely horizontal, but may be slightly inclined.

In the description of the present disclosure, it also should be indicated that unless otherwise expressly specified or defined, terms "provide", "mount", "couple", and "connect" should be understood broadly, and for example, a connection may be a fixed connection, or a detachable connection, or an integrated connection; may be a mechanical connection or an electric connection; or may be a direct connection, or an indirect connection via an intermediate medium, or may be an internal communication between two elements. The specific meanings of the above-mentioned terms in the disclosure could be understood by those skilled in the art according to specific situations.

Finally, it should be noted that the above embodiments are only used to illustrate the technical solutions of the present disclosure, rather than limiting the same; although the present disclosure has been described in detail with reference to the foregoing embodiments, those of ordinary skill in the art should understand that: It is still possible to modify the technical solutions described in the foregoing embodiments or equivalently replace some or all of the technical features; and these modifications or replacements do not deviate the essence of the corresponding technical solutions from the technical solutions of the embodiments of the present disclosure.

The invention claimed is:

1. A diffracted wave imaging method, comprising steps of:
acquiring pre-stack seismic wave field data of a to-be-processed area;
extracting target data of a target imaging point based on the pre-stack seismic wave field data, wherein the target imaging point is any imaging point of all the imaging points in the to-be-processed area, and the target data comprises: a stationary point position signal of a reflected wave and a signal of a diffracted wave event;
fitting target time sample points in the target data based on a Gaussian model and solving a fitting function to determine a distribution range of the stationary point position signal of the reflected wave in the target data, wherein the target time sample points are sampling points having a same time parameter;
determining migration imaging data of the target imaging point based on the target data and the distribution range; and
determining a diffracted wave imaging result of the to-be-processed area based on the migration imaging data of all the imaging points in the to-be-processed area.

2. The method according to claim 1, wherein the step of extracting target data of a target imaging point based on the pre-stack seismic wave field data comprises steps of:
performing a migration velocity analysis on the pre-stack seismic wave field data to determine a seismic wave migration velocity file;
performing migration processing on the pre-stack seismic wave field data based on the seismic wave migration velocity file to obtain common-imaging-point gather data of all imaging points in the to-be-processed area; and
performing signal component decomposition on the common-imaging-point gather data of the target imaging point according to stationary point Fresnel zone distribution characteristics of the reflected wave and morphological characteristics of the diffracted wave to obtain the target data.

3. The method according to claim 2, wherein the step of performing signal component decomposition on the common-imaging-point gather data of the target imaging point according to stationary point Fresnel zone distribution characteristics of the reflected wave and morphological characteristics of the diffracted wave to obtain the target data comprises steps of:
constructing an optimization function of the signal component decomposition according to the stationary point Fresnel zone distribution characteristics of the reflected wave and the morphological characteristics of the diffracted wave, wherein the optimization function is expressed as:

$$\min_{\{d_k\},\{\omega_k\}} \left\{ \sum_{k=1}^{N} \|\partial_x [d_k(x)e^{-j\omega_k x}]\|_2^2 \right\}, \quad \text{s.t.} \quad \sum_{k=1}^{N} d_k(x) = d(x),$$

where $d_k(x)$ represents a kth decomposed linear signal pattern, $\omega_k$ represents a center frequency of $d_k(x)$, x represents an inclined angle, N represents a total number of decomposed linear signal patterns, $\partial_x$ represents x-direction partial derivative operator, and d(x) represents the common-imaging-point gather data of the target imaging point;

transforming the optimization function into a Lagrangian unconstrained optimization function, wherein the Lagrangian unconstrained optimization function is expressed as $L(\{d_k\}, \{\omega_k\}, \lambda) :=$ $$\alpha \sum_{k=1}^{N} \|\partial_x [d_k(x)]e^{-j\omega_k x}\|_2^2 + \left\| d(x) - \sum_{k=1}^{N} d_k(x) \right\|_2^2 + \left\langle \lambda(x), d(x) - \sum_{k=1}^{N} d_k(x) \right\rangle,$$

where $\alpha$ represents a weighting factor, and $\lambda$ represents a Lagrangian multiplier; and solving the Lagrangian unconstrained optimization function to obtain the target data.

4. The method according to claim 1, wherein the step of fitting target time sample points in the target data based on a Gaussian model and solving the fitting function to determine a distribution range of the stationary point position signal of the reflected wave in the target data comprises steps of:

fitting the target time sample points in the target data with a fitting function $$J = \sum_{i=1}^{K} \left| \frac{c}{\sqrt{2\pi}\sigma} e^{-\frac{(a_i-\mu)^2}{2\sigma^2}} - b_i \right|,$$

where J represents a difference in fitting, K represents a number of the target time sample points, c represents an amplitude fitting multiple, $a_i$ represents a coordinate value in a horizontal direction of the ith target time sample point, $b_i$ represents an amplitude value corresponding to the $a_i$ position, μ represents a mean value of Gaussian models corresponding to the target time sample points, and σ represents a variance of the Gaussian models corresponding to the target time sample points;

transforming the fitting function with a logarithmic method to obtain an optimized fitting function;

solving the optimized fitting function to obtain a mean value and a variance of the Gaussian models corresponding to the target time sample points; and determining a distribution range of the stationary point position signal of the reflected wave in the target data based on the mean value and the variance of the Gaussian models corresponding to all time sample points.

5. The method according to claim 1, wherein the step of determining migration imaging data of the target imaging point based on the target data and the distribution range comprises:

setting to be zero an amplitude value of the stationary point position signal of the reflected wave within the distribution range, to obtain processed target data; and stacking the processed target data in a horizontal direction to obtain the migration imaging data of the target imaging point.

6. An electronic apparatus comprising a memory and a processor, the memory storing computer programs capable of running on the processor, wherein the processor implements steps of the method of claim 1 when executing the computer programs.

7. The electronic apparatus according to claim 6, wherein the step of extracting target data of a target imaging point based on the pre-stack seismic wave field data comprises steps of:

performing a migration velocity analysis on the pre-stack seismic wave field data to determine a seismic wave migration velocity file;

performing migration processing on the pre-stack seismic wave field data based on the seismic wave migration velocity file to obtain common-imaging-point gather data of all imaging points in the to-be-processed area; and performing signal component decomposition on the common-imaging-point gather data of the target imaging point according to stationary point Fresnel zone distribution characteristics of the reflected wave and morphological characteristics of the diffracted wave to obtain the target data.

8. The electronic apparatus according to claim 7, wherein the step of performing signal component decomposition on the common-imaging-point gather data of the target imaging point according to stationary point Fresnel zone distribution characteristics of the reflected wave and morphological characteristics of the diffracted wave to obtain the target data comprises steps of:

constructing an optimization function of the signal component decomposition according to the stationary point Fresnel zone distribution characteristics of the reflected wave and the morphological characteristics of the diffracted wave, wherein the optimization function is expressed as:

$$\min_{\{d_k\},\{\omega_k\}} \left\{ \sum_{k=1}^{N} \|\partial_x [d_k(x)e^{-j\omega_k x}]\|_2^2 \right\}, \quad \text{s.t.} \quad \sum_{k=1}^{N} d_k(x) = d(x),$$

where $d_k(x)$ represents a kth decomposed linear signal pattern, $\omega_k$ represents a center frequency of $d_k(x)$, x represents an inclined angle, N to represents a total number of decomposed linear signal patterns, $\partial_x$ represents x-direction partial derivative operator, and d(x) represents the common-imaging-point gather data of the target imaging point;

transforming the optimization function into a Lagrangian unconstrained optimization function, wherein the Lagrangian unconstrained optimization function is expressed as $L(\{d_k\}, \{\omega_k\}, \lambda) :=$ $$\alpha \sum_{k=1}^{N} \|\partial_x [d_k(x)]e^{-j\omega_k x}\|_2^2 + \left\| d(x) - \sum_{k=1}^{N} d_k(x) \right\|_2^2 + \left\langle \lambda(x), d(x) - \sum_{k=1}^{N} d_k(x) \right\rangle,$$

where $\alpha$ represents a weighting factor, and $\lambda$ represents a Lagrangian multiplier; and solving the Lagrangian unconstrained optimization function to obtain the target data.

9. The electronic apparatus according to claim 6, wherein the step of fitting target time sample points in the target data based on a Gaussian model and solving the fitting function to determine a distribution range of the stationary point position signal of the reflected wave in the target data comprises steps of:

fitting the target time sample points in the target data with a fitting function $$J = \sum_{i=1}^{K} \left| \frac{c}{\sqrt{2\pi}\,\sigma} e^{-\frac{(a_i-\mu)^2}{2\sigma^2}} - b_i \right|,$$

where J represents a difference in fitting, K represents a number of the target time sample points, c represents an amplitude fitting multiple, $a_i$ represents a coordinate value in a horizontal direction of the ith target time sample point, $b_i$ represents an amplitude value corresponding to the $a_i$ position, μ represents a mean value of Gaussian models corresponding to the target time sample points, and σ represents a variance of the Gaussian models corresponding to the target time sample points;

transforming the fitting function with a logarithmic method to obtain an optimized fitting function;

solving the optimized fitting function to obtain a mean value and a variance of the Gaussian models corresponding to the target time sample points; and determining a distribution range of the stationary point position signal of the reflected wave in the target data based on the mean value and the variance of the Gaussian models corresponding to all time sample points.

10. The electronic apparatus according to claim 6, wherein the step of determining migration imaging data of the target imaging point based on the target data and the distribution range comprises:

setting to be zero an amplitude value of the stationary point position signal of the reflected wave within the distribution range, to obtain processed target data; and stacking the processed target data in a horizontal direction to obtain the migration imaging data of the target imaging point.

11. A diffracted wave imaging device, comprising:

an acquisition module configured to acquire a pre-stack seismic wave field data of a to-be-processed area;

an extraction module configured to extract target data of a target imaging point based on the pre-stack seismic wave field data, wherein the target imaging point is any imaging point of all the imaging points in the to-be-processed area, and the target data comprises: a stationary point position signal of a reflected wave and a signal of a diffracted wave event;

a fitting module configured to fit target time sample points in the target data based on a Gaussian model and solve the fitting function to determine a distribution range of the stationary point position signal of the reflected wave in the target data, wherein the target time sample points are sampling points having same time parameter;

a first determination module configured to determine a migration imaging data of the target imaging point based on the target data and the distribution range; and a second determination module configured to determine a diffracted wave imaging result of the to-be-processed area based on the migration imaging data of all the imaging points in the to-be-processed area.

12. The device according to claim 11, wherein the extraction module comprises:

an analyzing unit configured to perform a migration velocity analysis on the pre-stack seismic wave field data to determine a seismic wave migration velocity file;

a migration processing unit configured to perform migration processing on the pre-stack seismic wave field data based on the seismic wave migration velocity file to obtain common-imaging-point gather data of all imaging points in the to-be-processed area; and a decomposing unit configured to perform signal component decomposition on the common-imaging-point gather data of the target imaging point according to stationary point Fresnel zone distribution characteristics of the reflected wave and morphological characteristics of the diffracted wave to obtain the target data.

13. The device according to claim 12, wherein the decomposing unit is configured to:

construct an optimization function of the signal component decomposition according to the stationary point Fresnel zone distribution characteristics of the reflected wave and the morphological characteristics of the diffracted wave, wherein the optimization function is expressed as:

$$\min_{\{d_k\},\{\omega_k\}} \left\{ \sum_{k=1}^{N} \left\| \partial_x [d_k(x) e^{-j\omega_k x}] \right\|_2^2 \right\}, \quad \text{s.t.} \quad \sum_{k=1}^{N} d_k(x) = d(x),$$

where $d_k(x)$ represents a kth decomposed linear signal pattern, $\omega_k$ represents a center frequency of $d_k(x)$, x represents an inclined angle, N represents a total number of decomposed linear signal patterns, $\partial_x$ represents x-direction partial derivative operator, and d(x) represents the common-imaging-point gather data of the target imaging point;

transform the optimization function into a Lagrangian unconstrained optimization function, wherein the Lagrangian unconstrained optimization function is expressed as $$L(\{d_k\},\{\omega_k\},\lambda) := \alpha \sum_{k=1}^{N} \left\| \partial_x [d_k(x)] e^{-j\omega_k x} \right\|_2^2 + \left\| d(x) - \sum_{k=1}^{N} d_k(x) \right\|_2^2 + \left\langle \lambda(x), d(x) - \sum_{k=1}^{N} d_k(x) \right\rangle,$$

where α represents a weighting factor, and λ represents a Lagrangian multiplier; and solve the Lagrangian unconstrained optimization function to obtain the target data.

\* \* \* \* \*